Patented Nov. 3, 1925.

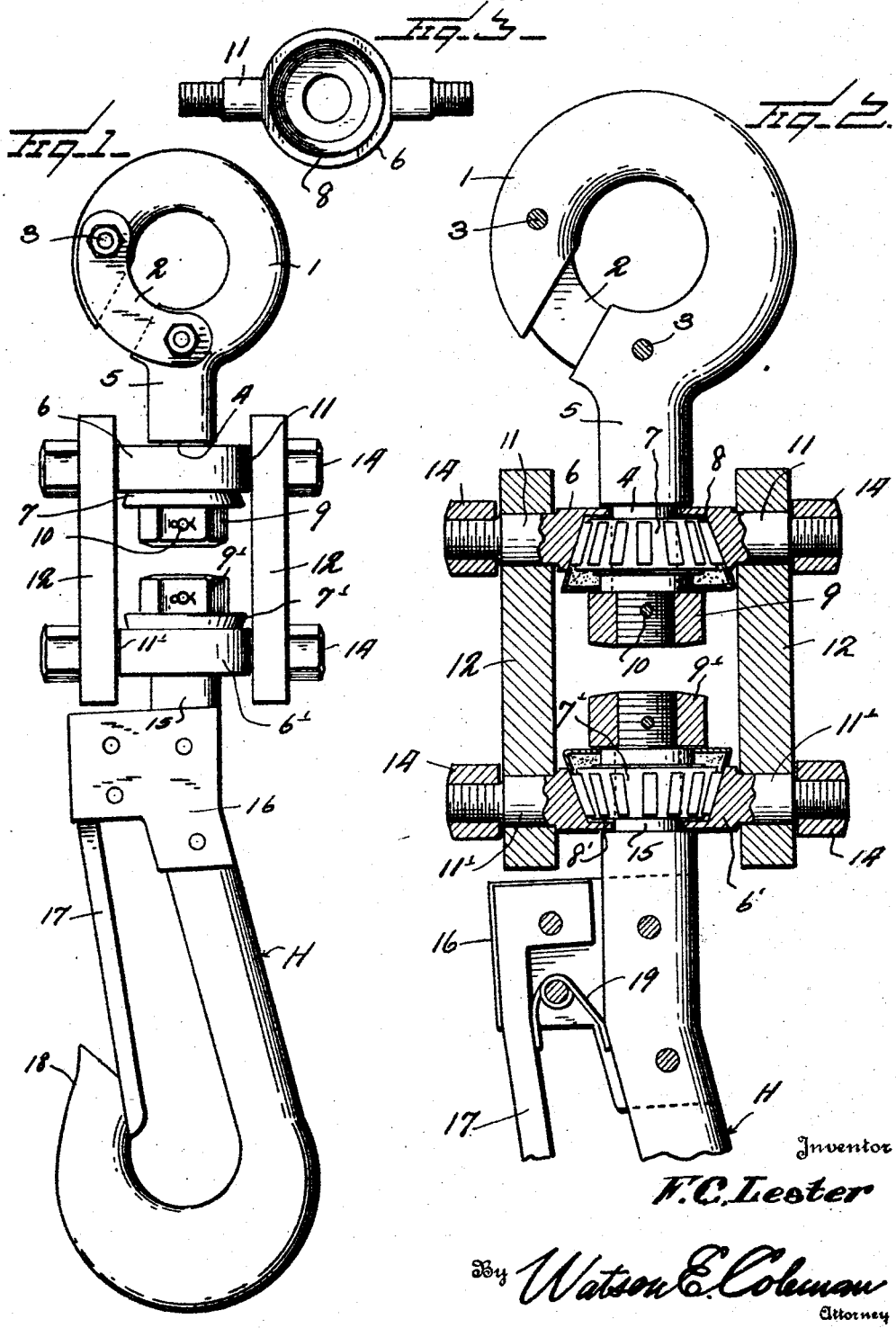

1,559,713

UNITED STATES PATENT OFFICE.

FRED C. LESTER, OF WICHITA FALLS, TEXAS.

SWIVEL HOOK.

Application filed June 16, 1925. Serial No. 37,497.

*To all whom it may concern:*

Be it known that I, FRED C. LESTER, a citizen of the United States, residing at Wichita Falls, in the county of Wichita and State of Texas, have invented certain new and useful Improvements in Swivel Hooks, of which the following is a specification, reference being had to the accompanying drawings.

This invention relates to certain improvements in swivel hooks and has relation more particularly to a device of this kind particularly adapted for use in pulling tubing and rods in oil wells, and it is an object of the invention to provide a device of this kind wherein a plurality of swivels are employed so that in the event one of the swivels should stick or otherwise become inoperative, a second swivel will take care of the line twist and substantially eliminate the possibility of unscrewing the rods or pipes.

Another object of the invention is to provide a device of this general character wherein roller bearings are employed.

The invention consists in the details of construction and in the combination and arrangement of the several parts of my improved swivel hook whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawings, wherein:—

Figure 1 is a view in elevation of a hook constructed in accordance with an embodiment of my invention;

Figure 2 is an enlarged fragmentary view partly in section and partly in elevation of the upper portion of the hook as illustrated in Figure 1;

Figure 3 is a view in plan of one of the bearing plates herein embodied.

As disclosed in the accompanying drawings, 1 denotes a top bearing hook which is adapted to be engaged with a cable or line and coacting with said hook 1 at opposite sides thereof are the straps 2 for closing the entrance to said hook, the straps 2 being held in applied position by the bolts 3 of a conventional type.

The free end portion 4 of the shank 5 of the bearing hook 1 is reduced and disposed axially through a bearing plate 6, said plate acting as a dust cap or cover for a roller bearing assembly 7, preventing dust or dirt from accumulating. The plate 6 in its inner face is provided with a bowl 8 the side wall of which being on a requisite bevel so that the roller bearings will have effective contact therewith. The bearing assembly 7 is held in applied position upon the reduced portion 4 of the shank 5 by the nut 9 threaded on said portion 4 outwardly of the assembly 7, said nut being held against displacement by a lock pin 10 disposed through said nut and portion 4.

At diametrically opposed points, the bearing plate 6 is provided with the outstanding trunnions 11 with which are engaged the strain straps 12 also operatively engaged with the diametrically opposed outstanding trunnions 11' carried by the lower bearing plate 6'. The straps 12 are held in applied position by the nuts 14 threaded upon the trunnions 11 and 11' outwardly of the straps 12.

Disposed axially from below through the lower plate 6' is the shank 15 of the elevator hook H, said shank 15 having mounted thereon a roller bearing assembly 7' received within the bowl 8' provided in the inner face of the cap or plate 6'. This bearing assembly 7' is maintained in applied position by a nut 9' in the same manner as hereinbefore set forth with respect to the bearing assembly 7.

The upper portion of the hook H has secured thereto a bracket 16 with which is operatively engaged a safety latch 17 coacting with the bill 18 of the hook H to prevent an elevator from jumping out of the hook, said latch being necessary to prevent or rather insure the safety of a well so far as dropping tubing and rods in the hole is concerned. The bracket 16 in addition to supporting the latch 17 also affords a housing for the latch spring 19.

The connection of the strain straps 12 with the trunnions 11 and 11' allow the hooks 1 and H to give with the load when not pulling on a straight pull and thereby lessening the stress on the bearings.

From the foregoing description it is thought to be obvious that a swivel hook constructed in accordance with my invention is particularly well adapted for use by reason of the convenience and facility with which it may be assembled and operated, and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:—

A swivel hook comprising, in combination, a pair of bearing plates each provided with oppositely disposed outstanding trunnions, straps connecting said bearing plates and engaged with the trunnions, a bearing hook operatively engaged with one of the bearing plates, and an elevating hook operatively engaged with a second of said bearing plates, the opposed faces of the bearing plates being provided with bowls, and roller gear assemblies fixed to said hooks and engaging within the bowls of the bearing plates.

In testimony whereof I hereunto affix my signature.

FRED C. LESTER.